United States Patent
Zhang et al.

(10) Patent No.: US 8,867,156 B2
(45) Date of Patent: Oct. 21, 2014

(54) SYSTEMS AND METHODS FOR P-DISTANCE BASED PRIORITY DATA PROCESSING

(71) Applicant: LSI Corporation, San Jose, CA (US)

(72) Inventors: Fan Zhang, Milpitas, CA (US); Lu Lu, San Jose, CA (US); Jun Xiao, Fremont, CA (US); Haitao Xia, San Jose, CA (US); Shaohua Yang, San Jose, CA (US); Rui Cao, San Jose, CA (US); Shu Li, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/798,638

(22) Filed: Mar. 13, 2013

(65) Prior Publication Data

US 2014/0268401 A1 Sep. 18, 2014

(51) Int. Cl.
*G11B 20/10* (2006.01)
*G06F 12/08* (2006.01)

(52) U.S. Cl.
CPC .............. *G06F 12/082* (2013.01); *G11B 20/10* (2013.01)
USPC .......................................... 360/39; 369/59.21

(58) Field of Classification Search
None
See application file for complete search history.

(56) References Cited

U.S. PATENT DOCUMENTS

| | | | |
|---|---|---|---|
| 7,113,356 B1 | 9/2006 | Wu | |
| 7,424,077 B2 | 9/2008 | Yang | |
| 7,783,958 B1 * | 8/2010 | Eidson et al. | 714/780 |
| 2003/0088834 A1 | 5/2003 | Murakami et al. | |
| 2006/0256670 A1 | 11/2006 | Park et al. | |
| 2010/0150181 A1 * | 6/2010 | Lee et al. | 370/503 |
| 2011/0129044 A1 * | 6/2011 | Zhidkow | 714/776 |
| 2011/0164669 A1 | 7/2011 | Mathew | |
| 2011/0264980 A1 * | 10/2011 | Li et al. | 714/752 |
| 2012/0119928 A1 * | 5/2012 | Yang | 341/94 |
| 2013/0007557 A1 * | 1/2013 | Yen | 714/755 |
| 2013/0016846 A1 | 1/2013 | Tan et al. | |
| 2013/0219233 A1 * | 8/2013 | Zhang et al. | 714/704 |
| 2013/0262788 A1 * | 10/2013 | Zhang et al. | 711/151 |

OTHER PUBLICATIONS

U.S. Appl. No. 13/766,874, filed Feb. 14, 2013, Shaohua Yang, Unpublished.
U.S. Appl. No. 13/602,535, filed Sep. 4, 2012, Fan Zhang, Unpublished.
U.S. Appl. No. 13/602,463, filed Sep. 4, 2012, Fan Zhang, Unpublished.
U.S. Appl. No. 13/561,230, filed Jul. 30, 2012, Fan Zhang, Unpublished.
U.S. Appl. No. 13/597,026, filed Aug. 28, 2012, Fan Zhang, Unpublished.
U.S. Appl. No. 13/558,245, filed Jul. 25, 2012, Fan Zhang, Unpublished.
U.S. Appl. No. 13/560,702, filed Jul. 27, 2012, Fan Zhang, Unpublished.
U.S. Appl. No. 13/552,403, filed Jul. 18, 2012, Fan Zhang, Unpublished.
U.S. Appl. No. 13/400,750, filed Feb. 21, 2012, Fan Zhang, Unpublished.
U.S. Appl. No. 138433,742, filed Mar. 29, 2012, Fan Zhang, Unpublished.

(Continued)

*Primary Examiner* — Thang Tran
(74) *Attorney, Agent, or Firm* — Hamilton DeSanctis & Cha

(57) ABSTRACT

The present inventions are related to systems and methods for data processing, and more particularly to systems and methods for priority based data processing.

18 Claims, 6 Drawing Sheets

(56) References Cited

OTHER PUBLICATIONS

U.S. Appl. No. 13/342,240, filed Jan. 3, 2012, Shaohua Yang, Unpublished.

U.S. Appl. No. 13/316,953, filed Dec. 12, 2011, Haitao Xia, Unpublished.

U.S. Appl. No. 13/340,974, filed Dec. 30, 2011, Dan Liu, Unpublished.

U.S. Appl. No. 13/445,848, filed Apr. 12, 2012, Bruce Wilson, Unpublished.

U.S. Appl. No. 13/251,342, filed Oct. 3, 2011, Haitao Xia, Unpublished.

* cited by examiner

SYSTEMS AND METHODS FOR P-DISTANCE BASED PRIORITY DATA PROCESSING

FIELD OF THE INVENTION

The present inventions are related to systems and methods for data processing, and more particularly to systems and methods for priority based data processing

BACKGROUND OF THE INVENTION

Various data transfer systems have been developed including storage systems, cellular telephone systems, radio transmission systems. In each of the systems data is transferred from a sender to a receiver via some medium. For example, in a storage system, data is sent from a sender (i.e., a write function) to a receiver (i.e., a read function) via a storage medium. In some cases, the data processing function uses a variable number of iterations through a data detector circuit and/or data decoder circuit depending upon the characteristics of the data being processed. Each data set is given equal priority until a given data set concludes either without errors in which case it is reporter, or concludes with errors in which case a retry condition may be triggered. In such a situation processing latency is generally predictable, but is often unacceptably large.

Hence, for at least the aforementioned reasons, there exists a need in the art for advanced systems and methods for data processing.

BRIEF SUMMARY OF THE INVENTION

The present inventions are related to systems and methods for data processing, and more particularly to systems and methods for priority based data processing.

Various embodiments of the present invention provide data processing systems that include: an input buffer circuit, a data detector circuit, and a selection circuit. The input buffer is operable to maintain at least a first data set and a second data set. The data detector circuit is operable to apply a data detection algorithm to a selected data set to yield a detected output. The selection circuit is operable to select one of the first data set and the second data set as the selected data set based at least in part on a first P-distance value associated with the first data set and a second P-distance value associated with the second data set.

This summary provides only a general outline of some embodiments of the invention. The phrases "in one embodiment," "according to one embodiment," "various embodiments", "one or more embodiments", "particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
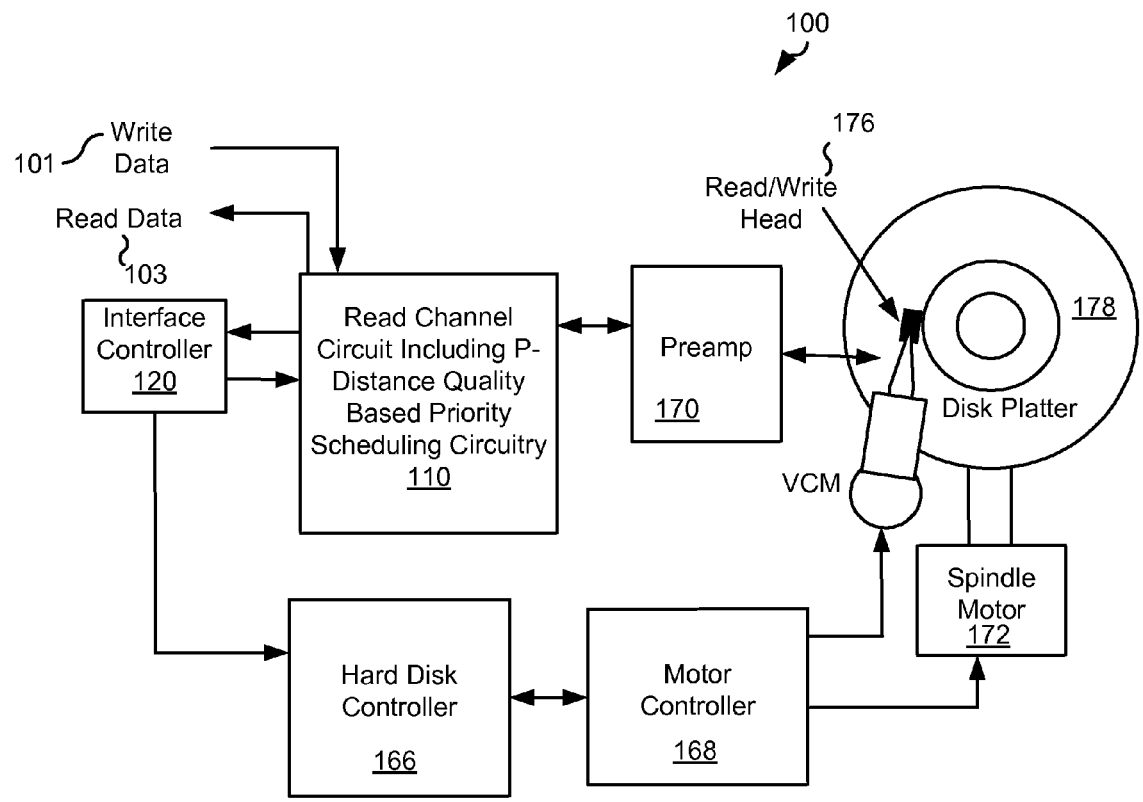
FIG. 1 shows a storage system including P-distance quality based priority scheduling circuitry in accordance with various embodiments of the present invention.

The present inventions are related to systems and methods for data processing, and more particularly to systems and methods for priority based data processing.

Various embodiments of the present invention provide for data processing that includes prioritizing processing data sets based upon a P-distance quality metric associated with the respective data set. The P-distance metric is calculated as the sum of a number of error values raised to a power (P). This approach does not use a division and thereby is much less costly to implement, and yet provides a reasonable estimate of quality. Raising the errors to a power and summing the results may be done using a combination of a summation circuit and a multiplication circuit, or may be implemented using only summation circuits. In one particular case where the power is one, the P-distance calculation circuit may be implemented using a single summation circuit.

As an example, a data processing system having a quality based priority scheduling circuit may include a data decoder circuit and a data detector circuit. When selecting a data set for processing by the data decoder circuit, the number of errors remaining after a preceding decode of the data set may be used to select which data set is processed next. When a data set for processing by the data detector circuit, the number of errors remaining after a preceding decode of the data set and/or an error value associated with a newly received data set may be used to select which data set is processed next. In some cases, the higher quality data set is chosen to be processed first to assure the lowest average latency across a number of data sets.

Various embodiments of the present invention provide data processing systems that include: an input buffer circuit, a data detector circuit, and a selection circuit. The input buffer is operable to maintain at least a first data set and a second data set. The data detector circuit is operable to apply a data detection algorithm to a selected data set to yield a detected output. The selection circuit is operable to select one of the first data set and the second data set as the selected data set based at least in part on a first P-distance value associated with the first data set and a second P-distance value associated with the second data set. In some instances of the aforementioned embodiments, the data detector circuit may be a Viterbi algorithm data detector circuit, or a maximum a posteriori data detector circuit. In one or more instances of the aforementioned embodiments, the data processing system is incorporated in a storage device or a data transmission device. In some cases, the data processing system is implemented as an integrated circuit.

In some instances of the aforementioned embodiments, the data processing system further includes a P-distance calculation circuit operable to calculate the P-distance value based upon the first data set and to calculate the second P-distance value based upon the second data set. In some such instances, the data processing system further includes: an analog to digital converter circuit operable to generate a series of digital samples based upon an analog input signal; an ideal value calculation circuit operable to calculate ideal values corresponding to the digital samples; an error value calculation circuit operable to calculate error values as a difference between corresponding instances of the ideal values and the digital samples. In such cases, the P-distance calculation circuit includes: an absolute value calculation circuit operable to generate absolute values of error inputs derived from the error values; a power calculation circuit operable to raise the absolute values to a defined power to yield power outputs; and an accumulator circuit operable to aggregate the power outputs to yield the first P-distance value. In particular cases, the P-distance calculation circuit further includes a saturation circuit operable to saturate the error values to a defined value to yield the error inputs. In some cases, the defined power and/or the defined value is/are programmable.

In other instances of the aforementioned embodiments, the data processing system further includes: an analog to digital converter circuit operable to generate a series of digital samples based upon an analog input signal; an equalizer circuit operable to equalize the digital samples to yield equalized samples; an ideal value calculation circuit operable to calculate ideal values corresponding to the equalized samples; and an error value calculation circuit operable to calculate an error values as a difference between corresponding instances of the equalized samples and the ideal values. In such instances, the P-distance calculation circuit includes: an absolute value calculation circuit operable to generate absolute values of error inputs derived from the error values; a power calculation circuit operable to raise the absolute values to a defined power to yield power outputs; and an accumulator circuit operable to aggregate the power outputs to yield the first P-distance value.

Other embodiments of the present invention provide methods for data processing that include: storing a first data set to an input buffer; storing a second data set to the input buffer; selecting one of the first data set and the second data set as a selected data set based upon a first P-distance value associated with the first data set and a second P-distance value associated with the second data set; and applying a data detection algorithm by a data detector circuit to the selected data set to yield a detected output.

Turning to FIG. 1, a storage system 100 including a read channel circuit 110 having P-distance quality based priority scheduling circuitry is shown in accordance with various embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

As part of processing the received information, read channel circuit 110 calculates a P-distance value for each data set received, and utilizes quality based priority scheduling circuitry that operates to prioritize application of processing cycles to higher quality codewords over lower quality codewords using the P-distance value as a proxy for quality. Such an approach operates to reduce latency of higher quality codewords and increases latency of lower quality codewords. Where higher quality codewords outnumber lower quality codewords, the average latency of all codewords is reduced. In some cases, read channel circuit 110 may be implemented to include a data processing circuit similar to that discussed below in relation to FIG. 3 or FIG. 5. Further, the prioritizing of codeword processing may be accomplished consistent with one of the approaches discussed below in relation to FIGS. 6a-6b.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

Figure 2:
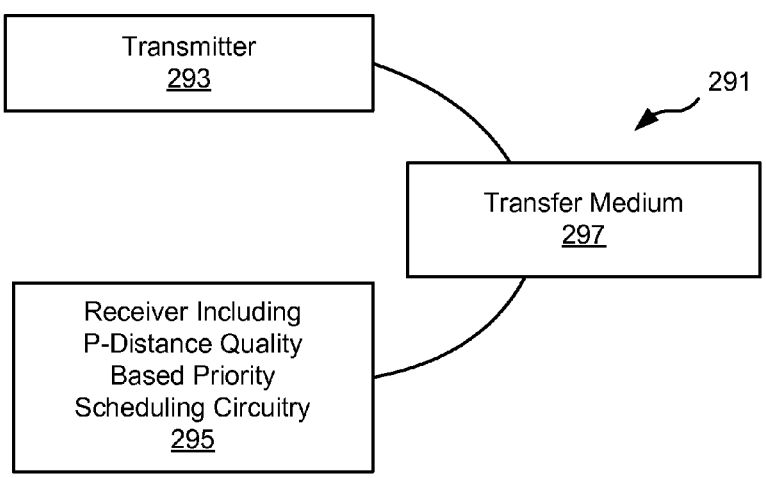
FIG. 2 depicts a data transmission system including P-distance quality based priority scheduling circuitry in accordance with one or more embodiments of the present invention.

Turning to FIG. 2, a data transmission system 291 including a receiver 295 having P-distance quality based priority scheduling circuitry is shown in accordance with various embodiments of the present invention. Data transmission system 291 includes a transmitter 293 that is operable to transmit encoded information via a transfer medium 297 as is known in the art. The encoded data is received from transfer medium 297 by a receiver 295. Receiver 295 processes the received input to yield the originally transmitted data. As part of processing the received information, receiver 295 calculates a P-distance value for each data set received, and utilizes quality based priority scheduling circuitry that operates to prioritize application of processing cycles to higher quality codewords over lower quality codewords using the P-distance value as a proxy for quality. Such an approach operates to reduce latency of higher quality codewords and increases latency of lower quality codewords. Where higher quality codewords outnumber lower quality codewords, the average latency of all codewords is reduced. In some cases, receiver 295 may be implemented to include a data processing circuit similar to that discussed below in relation to FIG. 3 or FIG. 5. Further, the prioritizing of codeword processing may be accomplished consistent with one of the approaches discussed below in relation to FIGS. 6a-6b.

Figure 3:
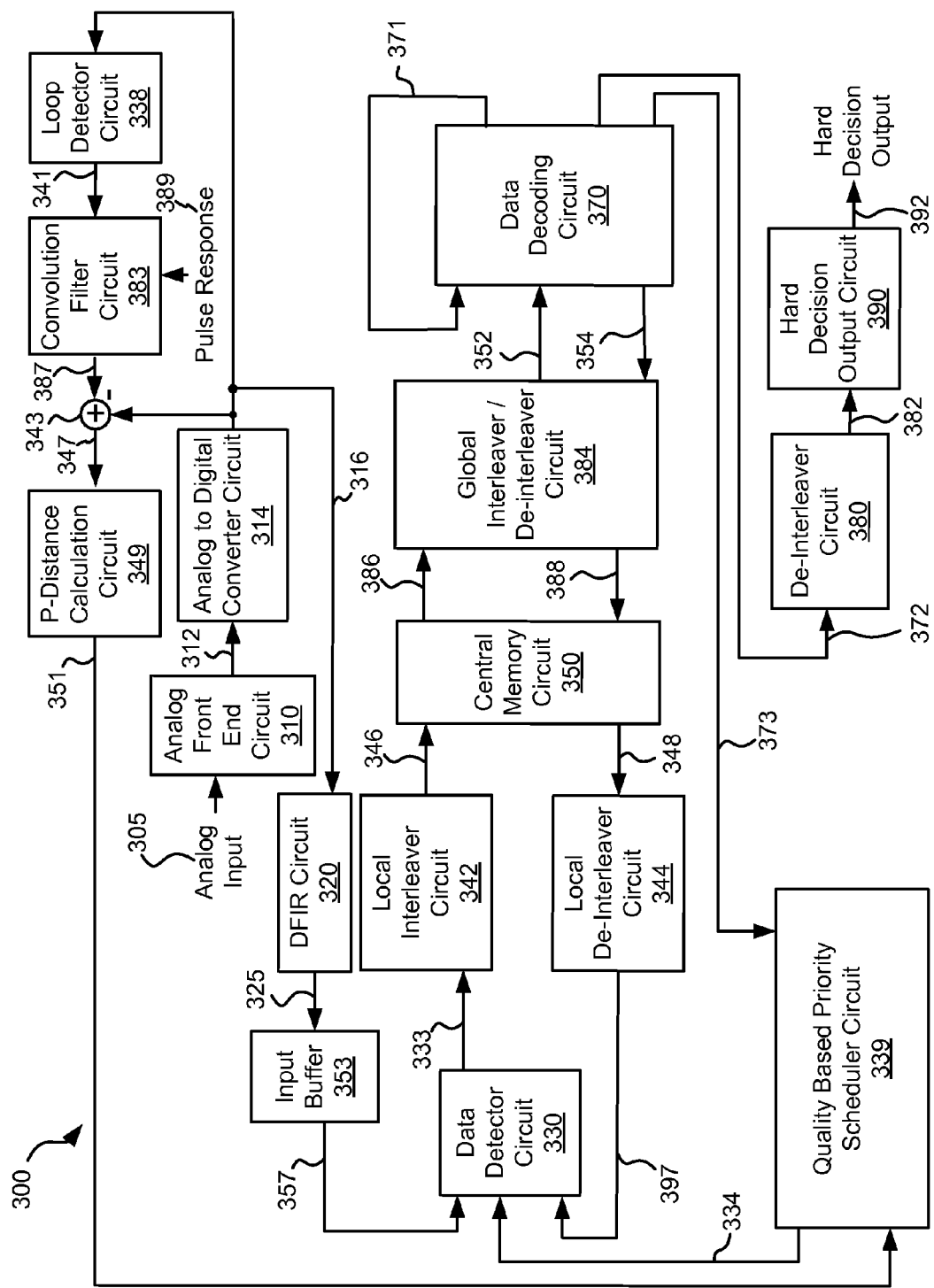
FIG. 3 shows a data processing circuit including a P-distance calculation circuit operating on ADC samples in accordance with some embodiments of the present invention.

FIG. 3 shows a data processing circuit 300 including a P-distance calculation circuit operating on ADC samples in accordance with some embodiments of the present invention. Data processing circuit 300 includes an analog front end circuit 310 that receives an analog signal 305. Analog front end circuit 310 processes analog signal 305 and provides a processed analog signal 312 to an analog to digital converter circuit 314. Analog front end circuit 310 may include, but is not limited to, an analog filter and an amplifier circuit as are known in the art. Based upon the disclosure provided herein, one of ordinary skill in the art will recognize a variety of circuitry that may be included as part of analog front end circuit 310. In some cases, analog signal 305 is derived from a read/write head assembly (not shown) that is disposed in relation to a storage medium (not shown). In other cases, analog signal 305 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input 305 may be derived.

Analog to digital converter circuit 314 converts processed analog signal 312 into a corresponding series of digital samples 316. Analog to digital converter circuit 314 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 316 are provided to a loop detector circuit 338 that applies a loop detection algorithm to digital samples 316 to yield a detected output 341. In some embodiments of the present invention, loop detector circuit 338 is a simplified version of data detector circuit 330 that is operable to provide detected output 341 as a rough approximation of what a detected output 333 will be when data detector circuit 330 applies the data detection algorithm to an equalized output 325 pulled from an input buffer 353. Loop detector circuit 338 may be any circuit known in the art that applies some type of algorithm designed to return a representation of the data from which analog signal 305 was derived. In one particular embodiment of the present invention, loop detector circuit 338 is operable to determine timing feedback and other operations designed to align the sampling of analog to digital converter circuit 314 with the received data set, and/or to adjust a gain applied by analog front end circuit 310. Based upon the disclosure provided herein, one of ordinary skill in the art will recognize a variety of circuits capable of providing a representation of the data from which analog signal 305 was derived that may be used in relation to different embodiments of the present invention.

Detected output 341 is provided to a convolution filter circuit 383 that convolves detected output 341 with a pulse response 389 to yield an ideal ADC output 387. Ideal ADC output 387 is subtracted from digital samples 316 using a summation circuit 343 to yield a series of error values 347 corresponding to digital samples 316, respectively. Error values 347 are provided to a P-distance calculation circuit 349. P-distance calculation circuit 349 saturates the received error values 347 to yield saturated values in accordance with the following pseudocode:

```
For (i = 1 to N){
    If(error values 347 (i) ≥ A){
        set saturated value (i) = A
    }
    Else If (error values 347 (i) ≤ −A){
        set saturated value (i) = −A
    }
    Else If (error values 347 (i) > −A && error values 347 (i) < A){
        set saturated value (i) = error values 347 (i)
    }
}
```

In some embodiments of the present invention, the value of A is fixed, while in other embodiments, the value of A is programmable. Additionally, P-distance calculation circuit 349 combines a number of instances of error values 347 to calculate a P-distance output 351 in accordance with the following equation:

$$P-\text{Distance Output } 351 = \sum_{i=0}^{N-1} [SaturatedValue(i)]^P.$$

In some embodiments of the present invention, the value of P is fixed, while in other embodiments, the value of P is programmable. In some cases, N corresponds to the number of elements in a received data set. In some cases, the data set may correspond to a 4K sector of data. In some cases, the data set may correspond to a 4K sector of data. Based upon the disclosure provided herein, one of ordinary skill in the art will recognize other values for N.

In addition, digital samples 316 are provided to an equalizer circuit 320. Equalizer circuit 320 applies an equalization algorithm to digital samples 316 to yield an equalized output 325. In some embodiments of the present invention, equalizer circuit 320 is a digital finite impulse response filter circuit as are known in the art. Equalized output 325 is stored to an input buffer 353 that includes sufficient memory to maintain one or more codewords until processing of that codeword is completed through a data detector circuit 330 and a data decoding circuit 370 including, where warranted, multiple global iterations (passes through both data detector circuit 330 and data decoding circuit 370) and/or local iterations (passes through data decoding circuit 370 during a given global iteration). An output 357 is provided to data detector circuit 330.

Data detector circuit 330 may be a single data detector circuit or may be two or more data detector circuits operating in parallel on different codewords. Whether it is a single data detector circuit or a number of data detector circuits operating in parallel, data detector circuit 330 is operable to apply a data detection algorithm to a received codeword or data set. In some embodiments of the present invention, data detector circuit 330 is a Viterbi algorithm data detector circuit as are known in the art. In other embodiments of the present invention, data detector circuit 330 is a is a maximum a posteriori data detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. In some cases, one data detector circuit included in data detector circuit 330 is used to apply the data detection algorithm to the received codeword for a first global iteration applied to the received codeword, and another data detector circuit included in data detector circuit 330 is operable apply the data detection algorithm to the received codeword guided by a decoded output accessed from a central memory circuit 350 on subsequent global iterations.

Upon completion of application of the data detection algorithm to the received codeword on the first global iteration, data detector circuit 330 provides a detector output 333. Detector output 333 includes soft data. As used herein, the phrase "soft data" is used in its broadest sense to mean reliability data with each instance of the reliability data indicating a likelihood that a corresponding bit position or group of bit positions has been correctly detected. In some embodiments of the present invention, the soft data or reliability data is log likelihood ratio data as is known in the art. Detected output 333 is provided to a local interleaver circuit 342. Local interleaver circuit 342 is operable to shuffle sub-portions (i.e., local chunks) of the data set included as detected output and provides an interleaved codeword 346 that is stored to central memory circuit 350. Interleaver circuit 342 may be any circuit known in the art that is capable of shuffling data sets to yield a re-arranged data set. Interleaved codeword 346 is stored to central memory circuit 350.

Once a data decoding circuit 370 is available, a previously stored interleaved codeword 346 is accessed from central memory circuit 350 as a stored codeword 386 and globally interleaved by a global interleaver/de-interleaver circuit 384. Global interleaver/De-interleaver circuit 384 may be any circuit known in the art that is capable of globally rearranging codewords. Global interleaver/De-interleaver circuit 384 provides a decoder input 352 into data decoding circuit 370. In some embodiments of the present invention, the data decode algorithm is a low density parity check algorithm as are known in the art. Based upon the disclosure provided herein, one of ordinary skill in the art will recognize other decode algorithms that may be used in relation to different embodiments of the present invention. Data decoding circuit 370 applies a data decode algorithm to decoder input 352 to yield a decoded output 371. In cases where another local iteration (i.e., another pass trough data decoder circuit 370) is desired, data decoding circuit 370 re-applies the data decode algorithm to decoder input 352 guided by decoded output 371. This continues until either a maximum number of local iterations is exceeded or decoded output 371 converges.

Where decoded output 371 fails to converge (i.e., fails to yield the originally written data set) and a number of local iterations through data decoder circuit 370 exceeds a threshold, the resulting decoded output is provided as a decoded output 354 back to central memory circuit 350 where it is stored awaiting another global iteration through a data detector circuit included in data detector circuit 330. Prior to storage of decoded output 354 to central memory circuit 350, decoded output 354 is globally de-interleaved to yield a globally de-interleaved output 388 that is stored to central memory circuit 350. The global de-interleaving reverses the global interleaving earlier applied to stored codeword 386 to yield decoder input 352. When a data detector circuit included in data detector circuit 330 becomes available, a previously stored de-interleaved output 388 accessed from central memory circuit 350 and locally de-interleaved by a de-interleaver circuit 344. De-interleaver circuit 344 re-arranges decoder output 348 to reverse the shuffling originally performed by interleaver circuit 342. A resulting de-interleaved output 397 is provided to data detector circuit 330 where it is used to guide subsequent detection of a corresponding data set previously received as equalized output 325.

Alternatively, where the decoded output converges (i.e., yields the originally written data set), the resulting decoded output is provided as an output codeword 372 to a de-interleaver circuit 380. De-interleaver circuit 380 rearranges the data to reverse both the global and local interleaving applied to the data to yield a de-interleaved output 382. De-interleaved output 382 is provided to a hard decision output circuit 390. Hard decision output circuit 390 is operable to re-order data sets that may complete out of order back into their original order. The originally ordered data sets are then provided as a hard decision output 392.

A higher value of P-distance output 351 indicates a lower quality of the corresponding data set. As codewords are processed through data decoding circuit 370 the number of remaining unsatisfied checks (i.e., the number of parity equations that could not be satisfied by the decoding algorithm) or errors in the codeword are reported to quality based priority scheduler circuit 339 as a decode quality metric 373. The higher the number reported as decode quality metric 373 indicates a lower quality.

Quality based priority scheduler circuit 339 uses P-distance output 351 and decode quality metric 373 to select the next codeword to be processed by data detector circuit 330 when it becomes available. In particular, the next codeword is either a previously unprocessed codeword from input buffer 353 that is processed by data detector circuit 330 without guidance from de-interleaved output 397 derived from central memory circuit 350, or a previously processed codeword from input buffer 353 that is processed by data detector circuit 330 with guidance from de-interleaved output 397 derived from central memory circuit 350. The selection is indicated to data detector circuit 330 by a codeword selector output 334.

In one particular embodiment of the present invention, quality based priority scheduler circuit 339 causes data detector circuit 330 to select a previously processed codeword from input buffer 353 that is processed by data detector circuit 330 with guidance from de-interleaved output 397 derived from central memory circuit 350 where a decoded output is available and ready for data detection in central memory circuit 350. In such a case, where two or more decoded outputs are available and ready for data detection in central memory circuit 350, quality based priority scheduler circuit 339 selects the decoded output to be provided as de-interleaved output 397 that exhibits the lowest value of decode quality metric 373. Alternatively, where no decoded outputs are available and ready for data detection in central memory circuit 350, quality based priority scheduler circuit 339 causes data detector circuit 330 to select a previously unprocessed codeword from input buffer 353. In such a case, where two or more previously unprocessed codewords are available in input buffer 353, quality based priority scheduler circuit 339 selects the codeword to be processed that exhibits the lowest value of P-distance output 351. Based upon the disclosure provided herein, one of ordinary skill in the art will recognize a variety of other priority algorithms that may be implemented by quality based priority scheduler circuit 339 in accordance with different embodiments of the present invention.

Figure 4:
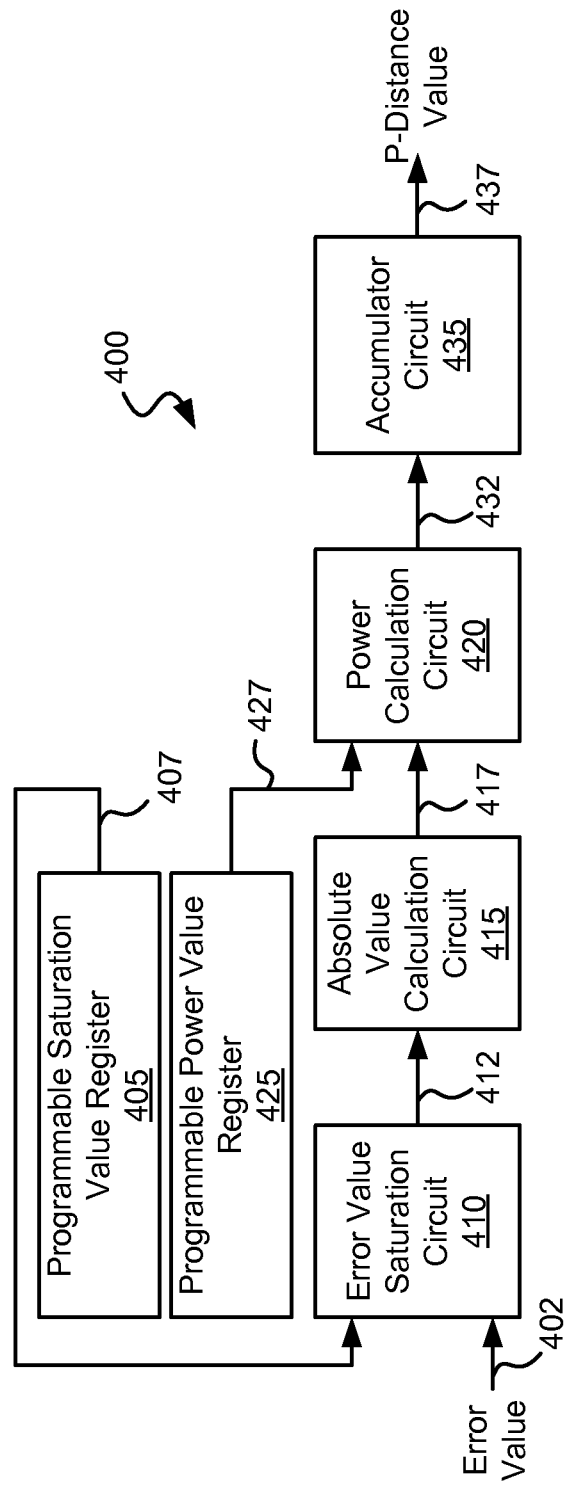
FIG. 4 depicts an example P-distance calculation circuit that may be used in relation to one or more embodiments of the present inventions.

Turning to FIG. 4, an example P-distance calculation circuit 400 is shown that may be used in relation to one or more embodiments of the present inventions. As one example, P-distance calculation circuit 400 may be used in place of P-distance calculation circuit 349 of FIG. 3. As shown, P-distance calculation circuit 400 includes an error value saturation circuit 410 that receives a series of error values 402, and applies a saturation algorithm to yield a saturated output 412 in accordance with the following pseudocode:

```
For (i=1 to N){
    If(error value 402 (i) ≥ A){
        set saturated output 412 (i) = A
    }
    Else If (error value 402 (i) ≤ -A){
        set saturated output 412 (i) = -A
    }
    Else(error value 402 (i) > -A && error value 402 (i) < A){
        set saturated output (i) 412 = error values 412 (i)
    }
}
```

The value of A is provided as an input 407 from a programmable saturation value register 405.

Saturated output 412 is provided to an absolute value circuit 415 that generates an absolute value of saturated output 412 to yield an absolute output 417 in accordance with the following equation:

Absolute Output 417=abs[Saturated Output 412]

Absolute output 417 is provided to a power calculation circuit 420 that generates the power of the absolute output 417 that is provided as a power output 432 in accordance with the following equation:

Power Output 432=[Absolute Output 417]$^P$, where the value of P is received as an input 427 from a programmable power value register 425. Power output 432 is provided to an accumulator circuit 435 that aggregates a number of instances of power output 432 to yield a P-distance output 437 in accordance with the following equation:

$$P-\text{Distance Output } 437 = \sum_{i=0}^{N-1} \text{Power Output } 432\ (i).$$

In some embodiments of the present invention, the value of P is fixed, while in other embodiments, the value of P is programmable. In some cases, N corresponds to the number of elements in a received data set. In some cases, the data set may correspond to a 4K sector of data. Based upon the disclosure provided herein, one of ordinary skill in the art will recognize other values for N.

Figure 5:
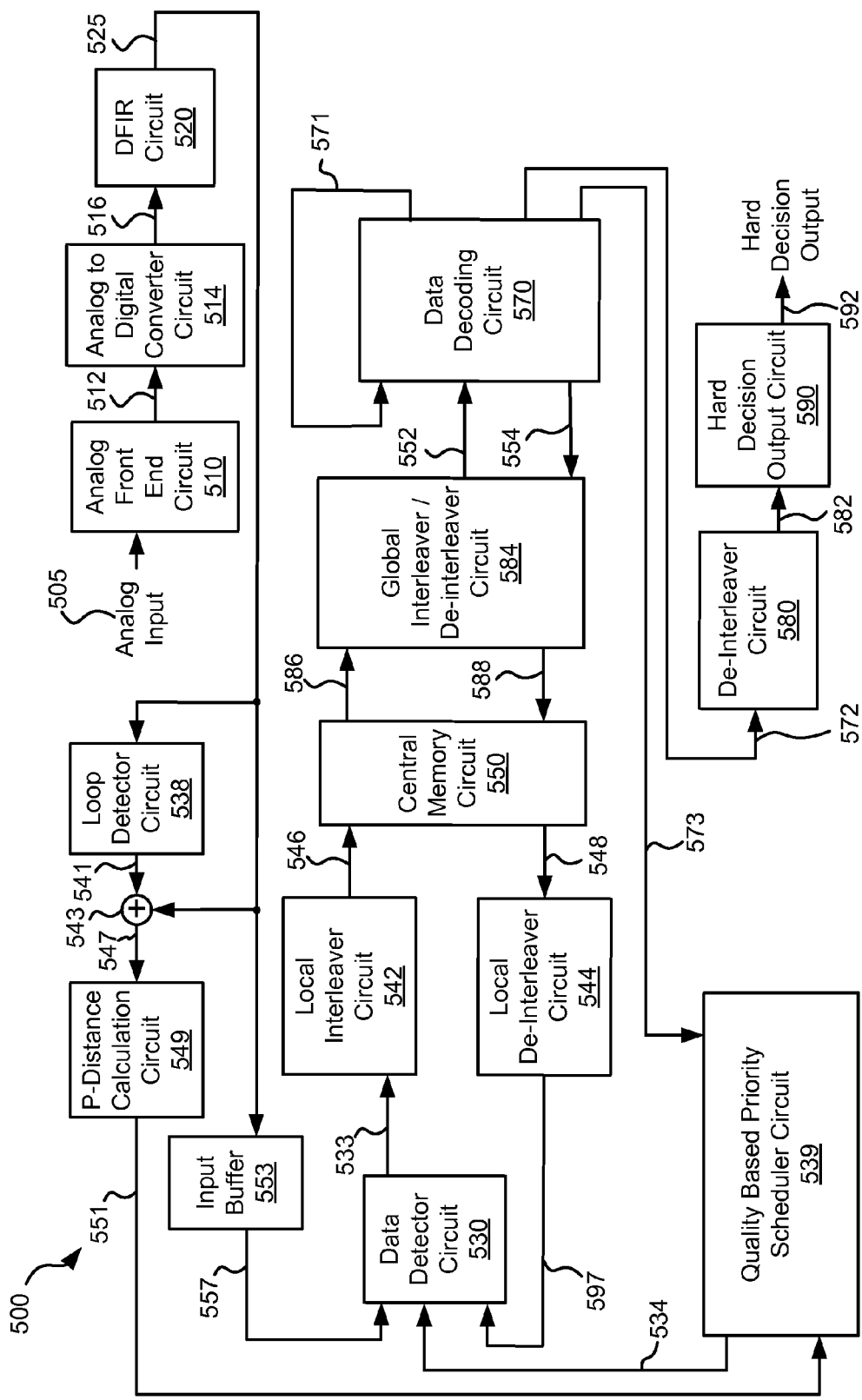
FIG. 5 shows a data processing circuit including a P-distance calculation circuit operating on equalized samples in accordance with various embodiments of the present invention.

Turning to FIG. 5, a data processing circuit 500 including a P-distance calculation circuit 549 operating on equalized samples in accordance with various embodiments of the present invention. Data processing circuit 500 includes an analog front end circuit 510 that receives an analog signal 505. Analog front end circuit 510 processes analog signal 505 and provides a processed analog signal 512 to an analog to digital converter circuit 514. Analog front end circuit 510 may include, but is not limited to, an analog filter and an amplifier circuit as are known in the art. Based upon the disclosure provided herein, one of ordinary skill in the art will recognize a variety of circuitry that may be included as part of analog front end circuit 510. In some cases, analog signal 505 is derived from a read/write head assembly (not shown) that is disposed in relation to a storage medium (not shown). In other cases, analog signal 505 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input 505 may be derived.

Analog to digital converter circuit 514 converts processed analog signal 512 into a corresponding series of digital samples 516. Analog to digital converter circuit 514 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 516 are provided to an equalizer circuit 520. Equalizer circuit 520 applies an equalization algorithm to digital samples 516 to yield an equalized output 525. In some embodiments of the present invention, equalizer circuit 520 is a digital finite impulse response filter circuit as are known in the art. It may be possible that equalized output 525 may be received directly from a storage device in, for example, a solid state storage system. In such cases, analog front end circuit 510, analog to digital converter circuit 514 and equalizer circuit 520 may be eliminated where the data is received as a digital data input. Equalized output 525 is stored to an input buffer 553 that includes sufficient memory to maintain one or more codewords until processing of that codeword is completed through a data detector circuit 530 and a data decoding circuit 570 including, where warranted, multiple global iterations (passes through both data detector circuit 530 and data decoding circuit 570) and/or local iterations (passes through data decoding circuit 570 during a given global iteration). An output 557 is provided to data detector circuit 530.

Data detector circuit 530 may be a single data detector circuit or may be two or more data detector circuits operating in parallel on different codewords. Whether it is a single data detector circuit or a number of data detector circuits operating in parallel, data detector circuit 530 is operable to apply a data detection algorithm to a received codeword or data set. In some embodiments of the present invention, data detector circuit 530 is a Viterbi algorithm data detector circuit as are known in the art. In other embodiments of the present invention, data detector circuit 530 is a is a maximum a posteriori data detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. In some cases, one data detector circuit included in data detector circuit 530 is used to apply the data detection algorithm to the received codeword for a first global iteration applied to the received codeword, and another data detector circuit included in data detector circuit 530 is operable apply the data detection algorithm to the received codeword guided by a decoded output accessed from a central memory circuit 550 on subsequent global iterations.

Upon completion of application of the data detection algorithm to the received codeword on the first global iteration, data detector circuit 330 provides a detector output 533. Detector output 533 includes soft data. As used herein, the phrase "soft data" is used in its broadest sense to mean reliability data with each instance of the reliability data indicating a likelihood that a corresponding bit position or group of bit positions has been correctly detected. In some embodiments of the present invention, the soft data or reliability data is log likelihood ratio data as is known in the art. Detected output 533 is provided to a local interleaver circuit 542. Local interleaver circuit 542 is operable to shuffle sub-portions (i.e., local chunks) of the data set included as detected output and provides an interleaved codeword 546 that is stored to central memory circuit 550. Interleaver circuit 542 may be any circuit known in the art that is capable of shuffling data sets to yield a re-arranged data set. Interleaved codeword 546 is stored to central memory circuit 550.

Once a data decoding circuit 570 is available, a previously stored interleaved codeword 546 is accessed from central memory circuit 550 as a stored codeword 586 and globally interleaved by a global interleaver/de-interleaver circuit 584. Global interleaver/De-interleaver circuit 584 may be any circuit known in the art that is capable of globally rearranging codewords. Global interleaver/De-interleaver circuit 584 provides a decoder input 552 into data decoding circuit 570. In some embodiments of the present invention, the data decode algorithm is a low density parity check algorithm as are known in the art. Based upon the disclosure provided herein, one of ordinary skill in the art will recognize other decode algorithms that may be used in relation to different embodiments of the present invention. Data decoding circuit 570 applies a data decode algorithm to decoder input 552 to yield a decoded output 571. In cases where another local iteration (i.e., another pass trough data decoder circuit 570) is desired, data decoding circuit 570 re-applies the data decode algorithm to decoder input 552 guided by decoded output 571. This continues until either a maximum number of local iterations is exceeded or decoded output 571 converges.

Where decoded output 571 fails to converge (i.e., fails to yield the originally written data set) and a number of local iterations through data decoder circuit 570 exceeds a threshold, the resulting decoded output is provided as a decoded output 554 back to central memory circuit 550 where it is stored awaiting another global iteration through a data detector circuit included in data detector circuit 530. Prior to storage of decoded output 554 to central memory circuit 550, decoded output 554 is globally de-interleaved to yield a globally de-interleaved output 588 that is stored to central memory circuit 550. The global de-interleaving reverses the global interleaving earlier applied to stored codeword 586 to yield decoder input 552. When a data detector circuit included in data detector circuit 530 becomes available, a previously stored de-interleaved output 588 accessed from central memory circuit 550 and locally de-interleaved by a de-interleaver circuit 544. De-interleaver circuit 544 re-arranges decoder output 548 to reverse the shuffling originally performed by interleaver circuit 542. A resulting de-interleaved output 597 is provided to data detector circuit 530 where it is used to guide subsequent detection of a corresponding data set previously received as equalized output 525.

Alternatively, where the decoded output converges (i.e., yields the originally written data set), the resulting decoded output is provided as an output codeword 572 to a de-interleaver circuit 580. De-interleaver circuit 580 rearranges the data to reverse both the global and local interleaving applied to the data to yield a de-interleaved output 582. De-interleaved output 582 is provided to a hard decision output circuit 590. Hard decision output circuit 590 is operable to re-order data sets that may complete out of order back into their original order. The originally ordered data sets are then provided as a hard decision output 592.

As equalized output 525 is being stored to input buffer 553, a P-distance output 351 generated based upon equalized output 525 is being determined. In particular, equalized output 525 is provided to a loop detector circuit 538 that applies a data detection algorithm to equalized output 525 to yield a detected output 541. In some embodiments of the present invention, loop detector circuit 538 is a simplified version of data detector circuit 530 that is operable to provide detected output 541 as a rough approximation of what detected output 533 will be when data detector circuit 530 applies the data detection algorithm to the same equalized output 525 pulled from input buffer 553. Based upon the disclosure provided herein, one of ordinary skill in the art will recognize a variety of data detector circuits that may be used in relation to different embodiments of the present invention. Detected output 541 is provided to a summation circuit 543 that is operable to subtract equalized output 525 from corresponding instances of detected output 541 to yield a series of error values 547.

Error values 547 are provided to a P-distance calculation circuit 549 that calculates a P-distance across each codeword received as equalized output 525. The calculated P-distance is provided as P-distance output 551 to quality based priority scheduler circuit 539. In such a case, a higher value of P-distance output 551 indicates a lower quality.

P-distance calculation circuit 549 saturates the received error values 547 to yield saturated values in accordance with the following pseudocode:

```
For (i=1 to N){
    If(error values 547 (i) ≥ A){
        set saturated value (i) = A
    }
    Else If (error values 547 (i) ≤ −A){
        set saturated value (i) = −A
    }
    Else If (error values 547 (i) > −A && error values 547 (i) < A){
        set saturated value (i) = error values 547 (i)
    }
}
```

In some embodiments of the present invention, the value of A is fixed, while in other embodiments, the value of A is programmable. Additionally, P-distance calculation circuit 549 combines a number of instances of error values 547 to calculate a P-distance output 551 in accordance with the following equation:

$$P-\text{Distance Output 551} = \sum_{i=0}^{N-1} [SaturatedValue(i)]^P.$$

In some embodiments of the present invention, the value of P is fixed, while in other embodiments, the value of P is programmable. In some cases, N corresponds to the number of elements in a received data set. In some cases, the data set may correspond to a 4K sector of data. In some cases, the data set may correspond to a 4K sector of data. Based upon the disclosure provided herein, one of ordinary skill in the art will recognize other values for N. P-distance calculation circuit 549 may be implemented similar to that discussed above in relation to FIG. 4.

In addition, as codewords are processed through data decoding circuit 570 the number of remaining unsatisfied checks (i.e., the number of parity equations that could not be satisfied by the decoding algorithm) or errors in the codeword are reported to quality based priority scheduler circuit 539 as a decode quality metric 573. The higher the number reported as decode quality metric 573 indicates a lower quality.

Quality based priority scheduler circuit 539 uses P-distance output 551 and decode quality metric 573 to select the next codeword to be processed by data detector circuit 530 when it becomes available. In particular, the next codeword is either a previously unprocessed codeword from input buffer 553 that is processed by data detector circuit 530 without guidance from de-interleaved output 597 derived from central memory circuit 550, or a previously processed codeword from input buffer 553 that is processed by data detector circuit 530 with guidance from de-interleaved output 597 derived from central memory circuit 550. The selection is indicated to data detector circuit 530 by a codeword selector output 534.

In one particular embodiment of the present invention, quality based priority scheduler circuit 539 causes data detector circuit 530 to select a previously processed codeword from input buffer 553 that is processed by data detector circuit 530 with guidance from de-interleaved output 597 derived from central memory circuit 550 where a decoded output is available and ready for data detection in central memory circuit 550. In such a case, where two or more decoded outputs are available and ready for data detection in central memory circuit 550, quality based priority scheduler circuit 539 selects the decoded output to be provided as de-interleaved output 597 that exhibits the lowest value of decode quality metric 573. Alternatively, where no decoded outputs are available and ready for data detection in central memory circuit 550, quality based priority scheduler circuit 539 causes data detector circuit 530 to select a previously unprocessed codeword from input buffer 553. In such a case, where two or more previously unprocessed codewords are available in input buffer 553, quality based priority scheduler circuit 539 selects the codeword to be processed that exhibits the lowest value of detect quality metric 351. Based upon the disclosure provided herein, one of ordinary skill in the art will recognize a variety of other priority algorithms that may be implemented by quality based priority scheduler circuit 339 in accordance with different embodiments of the present invention.

Figure 6A:
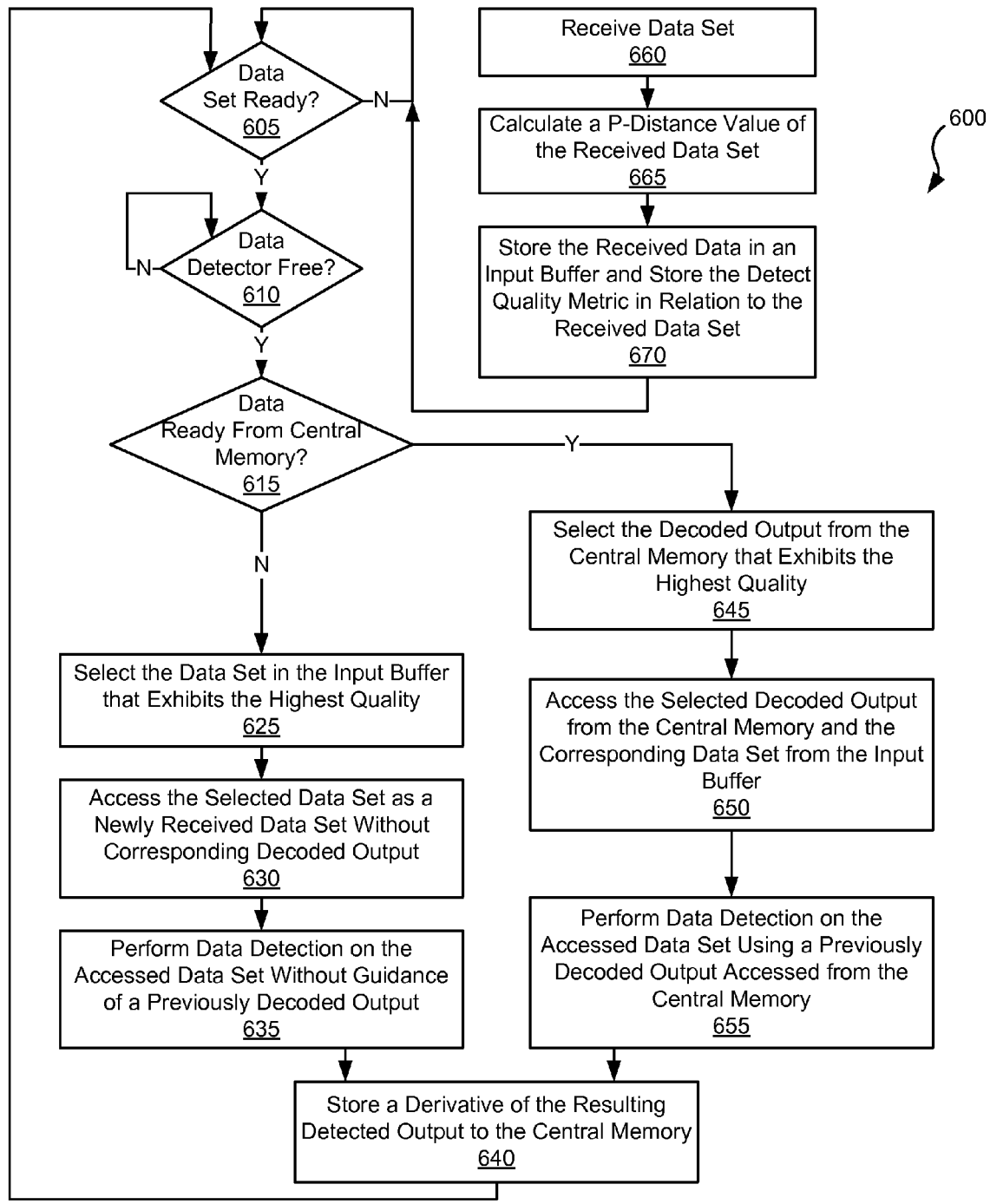
FIGS. 6a-6b are flow diagrams showing a method for P-distance quality based priority data processing in accordance with some embodiments of the present invention.
Figure 6B:
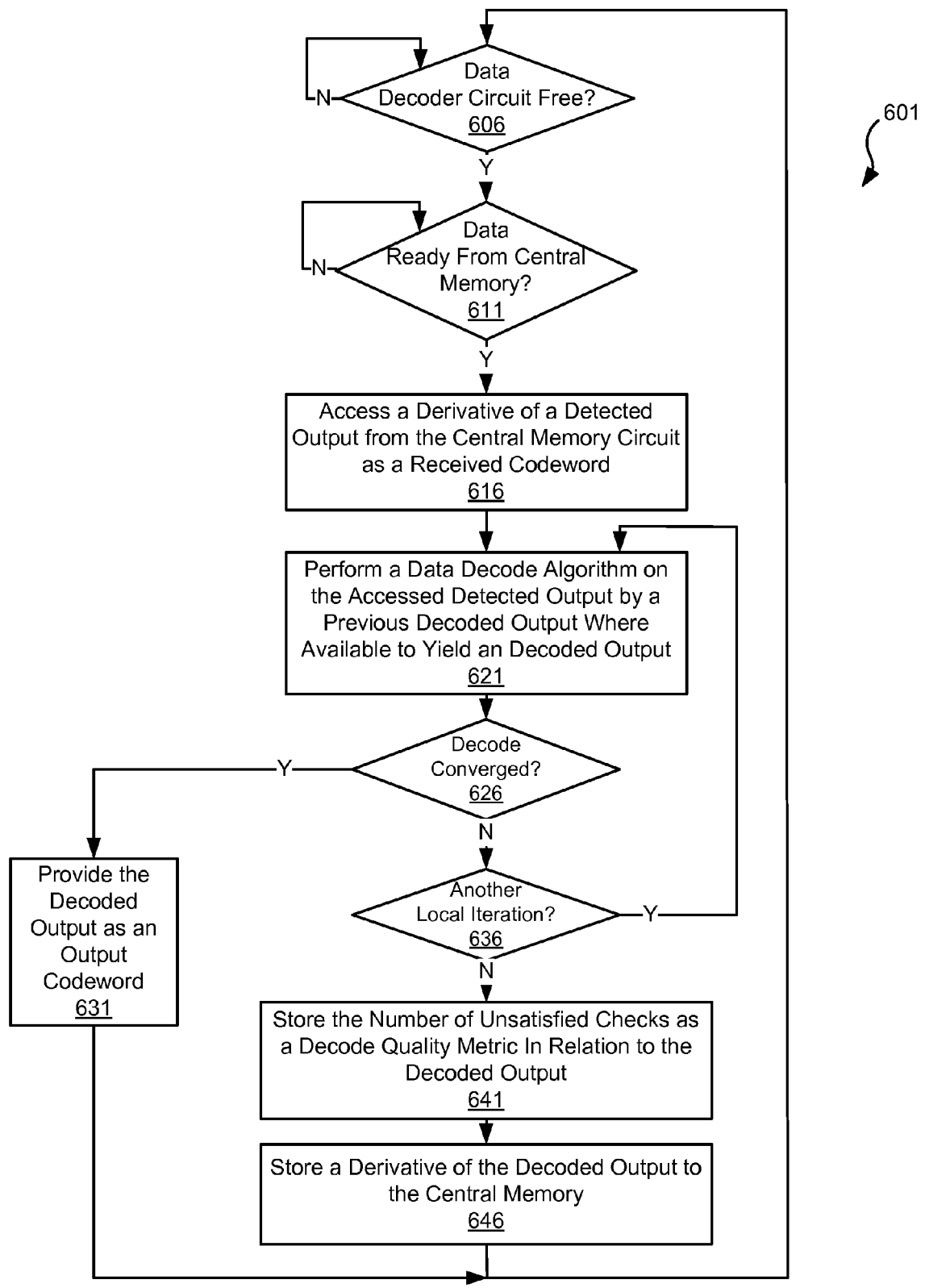

Turning to FIGS. 6a-6b, flow diagrams 600, 601 show a method for P-distance quality based priority data processing in accordance with some embodiments of the present invention. Following flow diagram 600 of FIG. 6a, a data set is received (block 660). This data set may be received, for example, from a storage medium or a communication medium. As the data set is received, a P-distance value is calculated for the data set (block 665). This calculation is done in accordance with the following equation:

$$P-\text{Distance Value} = \sum_{i=0}^{N-1} [\text{Received Value}(i) - \text{Ideal Value}]^P,$$

where the value P may be either fixed or programmable, and where N corresponds to the number of elements in a received data set. In some cases, the data set may correspond to a 4K sector of data. Based upon the disclosure provided herein, one of ordinary skill in the art will recognize other values for N. The received data set is stored in an input buffer and the detect quality metric is stored in relation to the received data set (block 670).

It is repeatedly determined whether a data set is ready for processing (block 605). A data set may become ready for processing where either the data set was previously processed and a data decode has completed in relation to the data set and the respective decoded output is available in a central memory, or where a previously unprocessed data set becomes available in the input buffer. Where a data set is ready (block 605), it is determined whether a data detector circuit is available to process the data set (block 610).

Where the data detector circuit is available for processing (block 610), it is determined whether there is a decoded output in the central memory that is ready for additional processing (block 615). Where there is not a decoded output in the central memory (block 615), the data set in the input buffer that exhibits the highest quality is selected (block 625). The highest quality is the data set that corresponds to the smallest P-distance value. In some cases, only one previously unprocessed data set is available in the input buffer. In such cases, the only available data set is selected. The selected data set is accessed from the input buffer (block 630) and a data detection algorithm is applied to the newly received data set (i.e., the first global iteration of the data set) without guidance of a previously decoded output (block 635). In some cases, the data detection algorithm is a Viterbi algorithm data detector circuit or a maximum a posteriori data detector circuit. Application of the data detection algorithm yields a detected output. A derivative of the detected output is stored to the central memory (block 640). The derivative of the detected output may be, for example, an interleaved or shuffled version of the detected output.

Alternatively, where a decoded output is available in the central memory and ready for additional processing (bock 615), the available decoded output in the central memory that exhibits the highest quality is selected (block 645). The highest quality is the decoded output that corresponds to a decode quality metric with the lowest value. In some cases, only one decoded output is available in the central memory. In such cases, the only available decoded output is selected. The data set corresponding to the selected decoded output is accessed from the input buffer and the selected decoded output is accessed from the central memory (block 650), and a data detection algorithm is applied to the data set (i.e., the second or later global iteration of the data set) using the accessed decoded output as guidance (block 655). Application of the data detection algorithm yields a detected output. A derivative of the detected output is stored to the central memory (block 640). The derivative of the detected output may be, for example, an interleaved or shuffled version of the detected output.

Turning to FIG. 6b, a flow diagram 601 shows a counterpart of the method described above in relation to FIG. 6a. Following flow diagram 601, in parallel to the previously described data detection process of FIG. 6a, it is determined whether a data decoder circuit is available (block 606). The data decoder circuit may be, for example, a low density data decoder circuit as are known in the art. Where the data decoder circuit is available (block 606), it is determined whether a derivative of a detected output is available for processing in the central memory (block 611). Where such a data set is ready (block 611), the previously stored derivative of a detected output is accessed from the central memory and used as a received codeword (block 616). A data decode algorithm is applied to the received codeword to yield a decoded output (block 621). Where a previous local iteration has been performed on the received codeword, the results of the previous local iteration (i.e., a previous decoded output) are used to guide application of the decode algorithm. It is then determined whether the decoded output converged (i.e., resulted in the originally written data) (block 626). Where the decoded output converged (block 626), it is provided as an output codeword (block 631). Alternatively, where the decoded output failed to converge (block 626), it is determined whether another local iteration is desired (block 636). In some cases, four local iterations are allowed per each global iteration. Based upon the disclosure provided herein, one of ordinary skill in the art will recognize another number of local iterations that may be used in relation to different embodiments of the present invention. Where another local iteration is desired (block 636), the processes of blocks 606-636 are repeated for the codeword. Alternatively, where another local iteration is not desired (block 636), the number of unsatisfied checks are stored as the decode quality metric in relation to the decoded output (block 641), and a derivative of the decoded output is stored to the central memory (block 646). The derivative of the decoded output being stored to the central memory triggers the data set ready query of block 605 to begin the data detection process.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for priority based data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
    an input buffer maintaining at least a first data set and a second data set;
    a P-distance calculation circuit that calculates a first P-distance value based upon the first data set and a second P-distance value based upon the second data set;
    a data detector circuit that applies a data detection algorithm to a selected data set to yield a detected output;
    a selection circuit that selects one of the first data set and the second data set as the selected data set based at least in part on the first P-distance value associated with the first data set and the second P-distance value associated with the second data set;
    an analog to digital converter circuit that generates a series of digital samples based upon an analog input signal;
    an ideal value calculation circuit that calculates ideal values corresponding to the digital samples;
    an error value calculation circuit that calculates error values as a difference between corresponding instances of the ideal values and the digital samples; and
    wherein the P-distance calculation circuit includes:
        an absolute value calculation circuit that generates absolute values of error inputs derived from the error values;
        a power calculation circuit that raises the absolute values to a defined power to yield power outputs; and
        an accumulator circuit that aggregates the power outputs to yield the first P-distance value.

2. The data processing system of claim 1, wherein the defined power is programmable.

3. The data processing system of claim 1, wherein the P-distance calculation circuit further comprises:
    a saturation circuit that saturates the error values to a defined value to yield the error inputs.

4. The data processing system of claim 3, wherein the defined value is programmable.

5. The data processing system of claim 1, wherein the data detector circuit is selected from a group consisting of: a Viterbi algorithm data detector circuit, and a maximum a posteriori data detector circuit.

6. The data processing system of claim 1, wherein the data processing circuit further comprises:
a data decoder circuit that applies a data decode algorithm to a decoder input derived from the detected output to yield a decoded output, wherein the data decoder circuit is a low density parity check decoder circuit.

7. The data processing system of claim 1, wherein the system is implemented as an integrated circuit.

8. The data processing system of claim 1, wherein the data processing system is incorporated in a device selected from a group consisting of: a storage device, and a data transmission device.

9. A method for data processing, the method comprising:
storing a first data set to an input buffer;
storing a second data set to the input buffer;
selecting one of the first data set and the second data set as a selected data set based upon a first P-distance value associated with the first data set and a second P-distance value associated with the second data set;
applying a data detection algorithm by a data detector circuit to the selected data set to yield a detected output;
calculating the first P-distance value based upon the first data set;
calculating the second P-distance value based upon the second data set;
receiving an analog input signal;
converting the analog input signal into a series of digital samples corresponding to the first data set and the second data set;
generating ideal values corresponding to the digital samples;
calculating error values as a difference between corresponding instances of the ideal values and the digital samples; and
generating absolute values of error inputs derived from the error values;
raising the absolute values to a defined power to yield power outputs; and
aggregating the power outputs to yield the first P-distance value.

10. The method of claim 9, wherein the method further comprises:
saturating the error values to a defined value to yield the error inputs; and
wherein at least one of the defined power or the defined error is programmable.

11. A data processing system, the data processing system comprising:
an input buffer maintaining at least a first data set and a second data set;
a P-distance calculation circuit that calculates a first P-distance value based upon the first data set and a second P-distance value based upon the second data set;
a data detector circuit that applies a data detection algorithm to a selected data set to yield a detected output;
a selection circuit that selects one of the first data set and the second data set as the selected data set based at least in part on the first P-distance value associated with the first data set and the second P-distance value associated with the second data set;
an analog to digital converter circuit that generates a series of digital samples based upon an analog input signal;
an equalizer circuit that equalizes the digital samples to yield equalized samples;
an ideal value calculation circuit that calculates ideal values corresponding to the equalized samples;
an error value calculation circuit that calculates error values as a difference between corresponding instances of the equalized samples and the ideal values; and
wherein the P-distance calculation circuit includes:
an absolute value calculation circuit that generates absolute values of error inputs derived from the error values;
a power calculation circuit that raises the absolute values to a defined power to yield power outputs; and
an accumulator circuit that aggregates the power outputs to yield the first P-distance value.

12. The data processing system of claim 11, wherein the defined power is programmable.

13. The data processing system of claim 11, wherein the P-distance calculation circuit further comprises:
a saturation circuit that saturates the error values to a defined value to yield the error inputs.

14. The data processing system of claim 13, wherein the defined value is programmable.

15. The data processing system of claim 11, wherein the data detector circuit is selected from a group consisting of: a Viterbi algorithm data detector circuit, and a maximum a posteriori data detector circuit.

16. The data processing system of claim 11, wherein the data processing circuit further comprises:
a data decoder circuit that applies a data decode algorithm to a decoder input derived from the detected output to yield a decoded output, wherein the data decoder circuit is a low density parity check decoder circuit.

17. The data processing system of claim 11, wherein the system is implemented as an integrated circuit.

18. The data processing system of claim 11, wherein the data processing system is incorporated in a device selected from a group consisting of: a storage device, and a data transmission device.

* * * * *